(12) United States Patent
Kim

(10) Patent No.: US 12,150,593 B2
(45) Date of Patent: Nov. 26, 2024

(54) FRYING APPARATUS HAVING OIL RECYCLING AND PURIFYING FUNCTION AND FRYING OIL SEPARATING FUNCTION

(71) Applicant: Jae Gon Kim, Cheonan-si (KR)

(72) Inventor: Jae Gon Kim, Cheonan-si (KR)

(*) Notice: Subject to any disclaimer, the term of this patent is extended or adjusted under 35 U.S.C. 154(b) by 837 days.

(21) Appl. No.: 17/158,116

(22) Filed: Jan. 26, 2021

(65) Prior Publication Data

US 2021/0235930 A1    Aug. 5, 2021

(30) Foreign Application Priority Data

Jan. 30, 2020    (KR) .................. 10-2020-0011263
Jan. 30, 2020    (KR) .................. 10-2020-0011268

(51) Int. Cl.
*A47J 37/12*     (2006.01)
*B01D 17/00*    (2006.01)

(52) U.S. Cl.
CPC .......... *A47J 37/1223* (2013.01); *B01D 17/10* (2013.01)

(58) Field of Classification Search
CPC . A47J 37/1219; A47J 37/1266; A47J 37/1223
See application file for complete search history.

(56) References Cited

U.S. PATENT DOCUMENTS

| | | | | |
|---|---|---|---|---|
| 4,372,980 A | * | 2/1983 | Luebke | G01N 27/06 99/337 |
| 5,568,765 A | * | 10/1996 | Andoh | H05B 6/80 99/410 |
| 5,973,297 A | * | 10/1999 | Winter | A47J 37/1266 219/439 |
| 6,322,831 B1 | * | 11/2001 | Mote | A47J 37/1219 426/523 |
| 7,141,764 B1 | * | 11/2006 | Shumate | A47J 37/1261 219/439 |
| 9,380,911 B1 | * | 7/2016 | Foster | A47J 37/1219 |
| 10,725,009 B2 | * | 7/2020 | Gotz | A47J 37/1266 |
| 2008/0237104 A1 | * | 10/2008 | Foster | A47J 36/38 210/167.28 |
| 2009/0044706 A1 | * | 2/2009 | Foster | A47J 36/00 99/410 |
| 2009/0084273 A1 | * | 4/2009 | Lackman | A47J 37/1223 99/408 |

(Continued)

FOREIGN PATENT DOCUMENTS

JP     108-140863 A     6/1996
JP     2016-217669 A    12/2016

(Continued)

*Primary Examiner* — Dana Ross
*Assistant Examiner* — Lawrence H Samuels
(74) *Attorney, Agent, or Firm* — KORUS Patent, LLC; Seong Il Jeong

(57) ABSTRACT

The present invention can provide a frying apparatus having an oil recycling and purifying function and a frying oil separating function including: a main body casing, at least one oil tank, a cooking heater, an oil purifying and circulating unit, a rotary drive unit, and an oil-outflow preventive cover, whereby a cooking oil used for cooking fried foods can periodically or continuously purified and recycled to have a constant purity, thus cooking the fried foods hygienically and also improving the taste of the fried foods, minimizing the consumption of the cooking oil to reduce costs.

1 Claim, 8 Drawing Sheets

(56) References Cited

U.S. PATENT DOCUMENTS

| | | | | |
|---|---|---|---|---|
| 2009/0309619 | A1* | 12/2009 | Behle | A47J 37/1223 |
| | | | | 99/403 |
| 2010/0258109 | A1* | 10/2010 | Foster | A47J 37/1219 |
| | | | | 126/299 E |
| 2012/0017773 | A1* | 1/2012 | Milliken | A47J 37/1219 |
| | | | | 99/410 |
| 2016/0051092 | A1* | 2/2016 | Bang | A47J 37/1266 |
| | | | | 99/408 |
| 2017/0367535 | A1* | 12/2017 | Gotz | A47J 37/1266 |
| 2018/0303287 | A1* | 10/2018 | Sean | A47J 37/1223 |

FOREIGN PATENT DOCUMENTS

| | | |
|---|---|---|
| KR | 20-0373575 Y1 | 1/2005 |
| KR | 10-1461122 B1 | 11/2014 |
| KR | 10-1522812 B1 | 5/2015 |
| KR | 10-2017-0002252 A | 1/2017 |
| KR | 10-2017-0039338 A | 4/2017 |

\* cited by examiner

FRYING APPARATUS HAVING OIL RECYCLING AND PURIFYING FUNCTION AND FRYING OIL SEPARATING FUNCTION

BACKGROUND OF THE INVENTION

(a) Field of the Invention

CROSS-REFERENCE TO RELATED APPLICATION(S)

This application claims the benefit of Korean Patent Application No. 10-2020-0011263 filed on Jan. 30, 2020 and Korean Patent Application No. 10-2020-0011268 filed on Jan. 30, 2020 in the Korean Industrial Property Office, each of which is incorporated herein by reference in its entirety.

The present invention relates to a frying apparatus having an oil recycling and purifying function and a frying oil separating function. More particular, the present invention relates to a frying apparatus having an oil recycling and purifying function and a frying oil (fat) separating function in which a cooking oil used for cooking fried foods can periodically or continuously purified and recycled to have a constant purity, thus cooking the fried foods hygienically and also improving the taste of the fried foods, the consumption of the cooking oil can also be minimized to reduce costs, and at the position where the fried foods are cooked, the oil is automatically and conveniently separated and removed from an immediate next frying, thus making the texture crisper and preventing excessive intake of frying oil.

(b) Description of the Related Art

Various types of foods are known for cooking, and among them, the most popular food is a fried food. The fried food refers to a food in which fish, meat, vegetables, etc., are dipped in flour and fried in oil. However, restaurants such as fast food restaurants, chicken specialty stores, and fried food specialty stores provide such fried foods, and the recent trend is that these restaurants are increasing exponentially.

A restaurant that provides such fried foods may think that a cooking method of storing the frying oil in a tank, heating it, putting food ingredients therein, frying them, and then taking out the fried foods using a mesh is relatively simple. However, during the cooking process, the temperature of the frying oil is 150~200° C., which requires considerable attention, and the oil tank is also exposed to the outside, so that special attention is required.

However, there was a problem that the cooking persons are burned by the frying oil splashing in a frying device even if they tried to be careful.

In order to solve these problems, a frying apparatus was recently invented, and this frying apparatus has solved the above problems by a technique that when the central shaft is fixed to a basket and the central shaft is lowered, foods enter the oil tank and is fried, and when the frying is completed, the central shaft ascends and the foods are removed from the oil tank.

However, as the central shaft is inserted through the oil tank, a sealing bearing is installed between the central shaft and the oil tank through a wear-resistant filler and a sealing ring. However, since the temperature of the frying oil is high, there is a problem that the sealing bearing is damaged, which requires continuous replacement.

Further, the fried foods that have been fried and come out are in a state where the oil has not been completely removed. Therefore, if the fried food is eaten, the fried oil is ingested as it is, which causes obesity which has been the most problematic for modern people. In addition, there was a problem that the taste and quality of fried foods were deteriorated because the oil (fat) remained in the fried food.

In particular, the taste of fried food differs depending on the cooking time, the temperature of the frying oil, the conditions for removing the frying oil, and the like. However, since the above conditions differ depending on the ability of the cooking person, there was a problem that even the same restaurant could not create the same taste, and the taste of the food was different.

On the other hand, there was a problem that if the frying oil may be easily deteriorated during the heating and cooking process when it is used for a long time, and that impurities including oil ash lumps were easily generated inside, which may adversely affect health.

Further, conventionally, since the frying oil that had been deteriorated in this way had to be discharged to the outside one by one, and replaced so that new frying oil could be used, there was a problem that the consumption of frying oil gradually increased and the cost could be increased.

In addition, conventionally, after the cooking of the fried food has been completed to make the texture of the fried food crispier, the cooking person had to manually take out the fried food directly from the cooking position and separate the frying oil. Therefore, the process of separating the frying oil from the fried food is much more inconvenient, and accidents such as burns may occur in the process of transfer.

In addition, in the process of the cooking person taking out the fried food from the cooking position and transferring it to the frying oil separating position separately, once the frying oil comes into contact with the outside air, a thin oil oxide film is instantly formed, and no matter how much the oil separation work is performed at the frying oil separating position, the oil may not be properly separated from the fried foods, making it difficult to properly obtain a crispy texture, and it may not be possible to prevent excessive intake of the frying oil.

PRIOR ART LITERATURE

[Patent Literature 1] Korean Registered Patent No. 10-1146881.
[Patent Literature2] Korean Registered Patent No. 10-0542421.

SUMMARY OF THE INVENTION

Technical Problem

An object of the present invention is to provide a frying apparatus having an oil recycling and purifying function and a frying oil separating function, in which cooking of fried food, circulation and purification of cooking oil (purifying once after cooking three times), and separation and removal of frying oil can be integrally performed at one location, thus hygienically cooking the fried food with a cooking oil in a cleanly refined state (antioxidation of fried flour), and also improving the taste of the fried food, the consumption of the cooking oil can also be minimized to reduce costs, and at the position where the fried foods are cooked, the oil can be automatically rotated and quickly separated and removed from an immediate next frying, so that the process of separating frying oil from fried food can be made extremely convenient and safe.

Another object of the present invention is to provide a frying apparatus having an oil recycling and purifying function and a frying oil separating function, in which upon completion of the fry cooking, the fried food does not have to be manually taken out by a cooking person, and the oil separation work can be automatically performed on the spot to prevent the formation of an oxide film of oil and ensure smooth and efficient separation of frying oil, so that it makes the texture of fried foods more crispy and prevents excessive intake of frying oil.

Technical Solution

In order to achieve the above object, the frying apparatus of the present invention includes: a main body casing that forms an exterior, a basket which is provided at the outside of the main body casing, puts a cooking material therein, and formed of a mesh body, at least one oil tank that is configured to accommodate the basket at the inside of the main body casing and stores a cooking oil therein, a cooking heater that is provided on the outer peripheral surface of the oil tank, boils the cooking oil stored inside the oil tank to perform a fry cooking, an oil purifying and circulating unit that is provided in communication with the lower part of the oil tank, and is configured to circulate the process in which the cooking oil used for fry cooking is collected and purified at the oil tank, and then supplied to the oil tank again, a rotary drive unit that allows the basket to rotate so that oil is separated from the fried food contained inside the basket by rotational centrifugal force, and an oil-outflow preventive cover that is fixedly installed to prevent the oil separated from the fried food contained in the basket from splashing to other places during rotation of the basket.

In a first embodiment of the present invention, the frying apparatus further includes a basket holder provided so as to expose the opening to the upper part of the main body casing, with the basket being provided so as to be hung and accommodated inside the basket holder. The oil tank further includes an elevating drive unit that is provided so that it can be elevated and descended to accommodate the basket when ascending from the lower part of the basket holder, and is connected to the oil tank and provides a driving force that allows the oil tank to elevate.

the elevating drive unit is provided adjacent to the lower part of the oil tank, and the rotary drive unit allows the basket to rotate when the oil tank descends, and is provided adjacent to the lower center of the basket holder to be connected with the basket holder.

According to a second embodiment of the present invention, the basket is provided to be hung and accommodated in the inside of the oil tank, one side of the upper part of the main body casing is provided with an oil tank to expose an opening in the main body casing, the other side of the upper part of the main body casing is further provided with an oil separation unit that is provided so as to expose an opening at the inside of the main body casing, in which the basket containing the fried food subjected to fry cooking is moved, hung and accommodated therein, the oil separation unit includes: a rotating body having an opening exposed through the other upper side of the main body casing and having a basket accommodated therein, and an oil recovery tank that is provided in communication between the rotating body and the oil-outflow preventive cover so that the oil separated from the frying inside the basket is separately collected and stored during rotation of the rotating body, a basket holder is provided in the inside of the rotating body so that the basket containing the fried food subjected to cooking is hung on the upper part, and the rotating body is connected to the rotary drive unit, and rotates together with the basket provided therein by the rotation driving unit.

According to a third embodiment of the present invention, it has the same configuration as the first embodiment of the present invention, the basket is provided to be hung and accommodated in the inside of a further second oil tank, one side of the upper part of the main body casing is provided with another oil tank so that an opening is exposed at the inside of the main body casing, the other side of the upper part of the main body casing is further provided with an oil separation unit that is provided so as to expose an opening at the inside of the main body casing, in which the basket containing the fried food subjected to fry cooking is moved, hung and accommodated therein, the oil separation unit includes: a rotating body having an opening exposed through the other upper side of the main body casing and having a basket accommodated therein, and an oil recovery tank that is provided in communication between the rotating body and the oil-outflow preventive cover so that the oil separated from the frying inside the basket is separately collected and stored during rotation of the rotating body, and the rotating body is connected to the rotary drive unit, and rotates together with the basket provided therein by the rotation driving unit.

In addition, the purifying and circulating pipe that is provided in communication with the lower central part of the oil tank, and is provided in a double pipe structure so that the used cooking oil is discharged from the inside, while the purified cooking oil is supplied to the oil tank again, an oil discharge pipe provided on one side of the end of the purifying and circulating pipe to discharge the used cooking oil, a purified oil suction pipe that is provided on the other side of the end part of the purifying and circulating pipe to provide a path through the purified cooking oil is sucked again through the purifying and circulating pipe, an oil purifying and circulating tank in which the oil discharge pipe and the refined oil suction pipe are connected and provided so that the cooking oil flowing in through the oil discharge pipe is purified and only the purified cooking oil is suctioned through the purified oil suction pipe, and a suction pump that is provided in a purified oil suction pipe to provide an intake input for sucking the purified cooking oil from a purified circulation tank of oil. The oil purifying and circulating tank is provided in the form of a box having an opened upper part, a filter mesh is provided above the middle part, and a purifying filter is provided below the height of the middle part, and the oil discharge pipe extends only from the inside of the oil purifying and circulating tank to the upper part of the filter mesh. The purified oil suction pipe is provided so as to extend from the inside of the purified oil purifying and circulating tank to the lower part of the purifying filter. The purifying and circulating pipe is provided so that an inner pipe of the central part communicates with the oil discharge pipe and an exterior communicates with the purified oil suction pipe.

Advantageous Effects

According to the present invention, the frying apparatus having an oil recycling and purifying function and a frying oil separating function can be provided in which cooking of fried food, circulation and purification of cooking oil, and separation and removal of frying oil can be integrally performed at one location, thus hygienically cooking the fried food with a cooking oil in a cleanly refined state, and also improving the taste of the fried food, the consumption of the cooking oil can also be minimized to reduce costs, and at the position where the fried foods are cooked, the oil can be automatically rotated and quickly separated and removed from the next fried food, so that the process of separating frying oil from fried food can be made extremely convenient and safe. Furthermore, there is an effect that the oil can be conveniently rotated and removed at an immediate next frying in an automatic manner at the position where the fry cooking is performed without moving the basket as needed.

DETAILED DESCRIPTION OF THE EMBODIMENTS

Hereinafter, preferred embodiments of the present invention will be described with reference to the accompanying figures. In the following description, the line thickness or the size of components shown in the figures may be exaggerated for clarity and convenience of description.

Also, the terms described below are terms defined in consideration of the functions in the present invention, which may differ depending on the intentions or customs of the user and the operator. Therefore, definitions of such terms should be made based on the contents through the present specification.

The following examples are not intended to limit the scope of the present invention, but are merely exemplifying the components presented in the claims of the present invention, and examples that are included in the technical idea throughout the specification of the present invention and include components that can be replaced as equivalents in the components of the claims may be included in the scope of the present invention.

Figure 1:
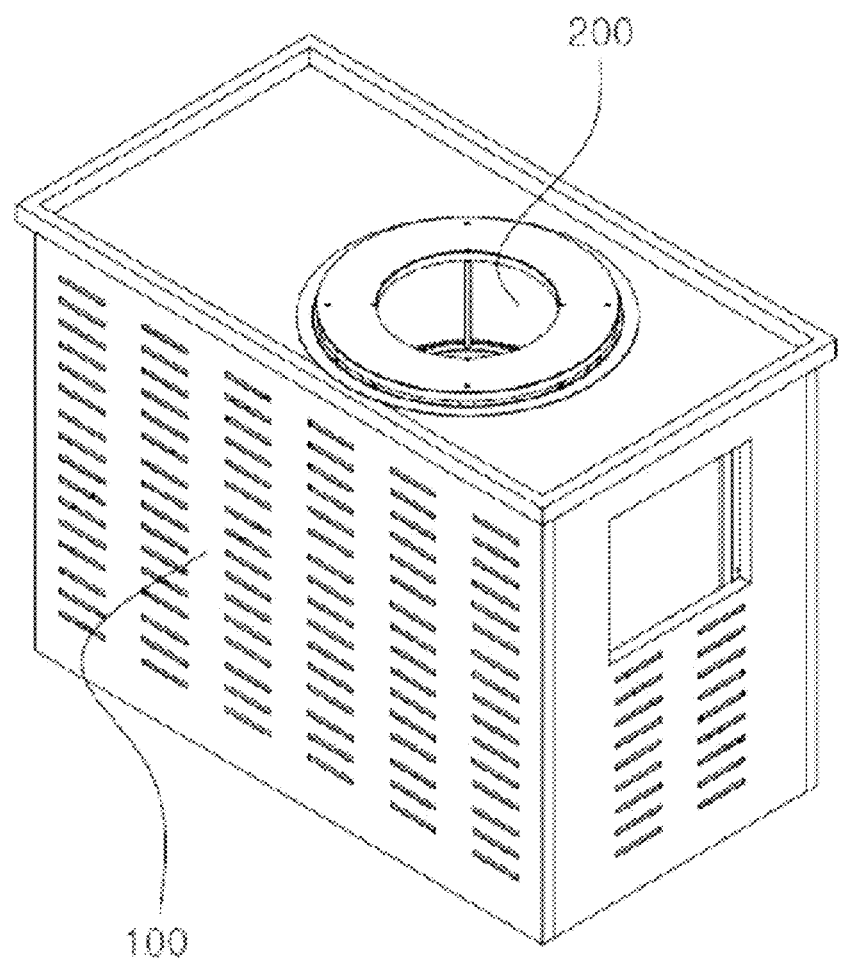
FIG. 1 is a perspective view showing the exterior of a frying apparatus having an oil recycling and purifying function and a frying oil separating function according to the present invention.
Figure 2:
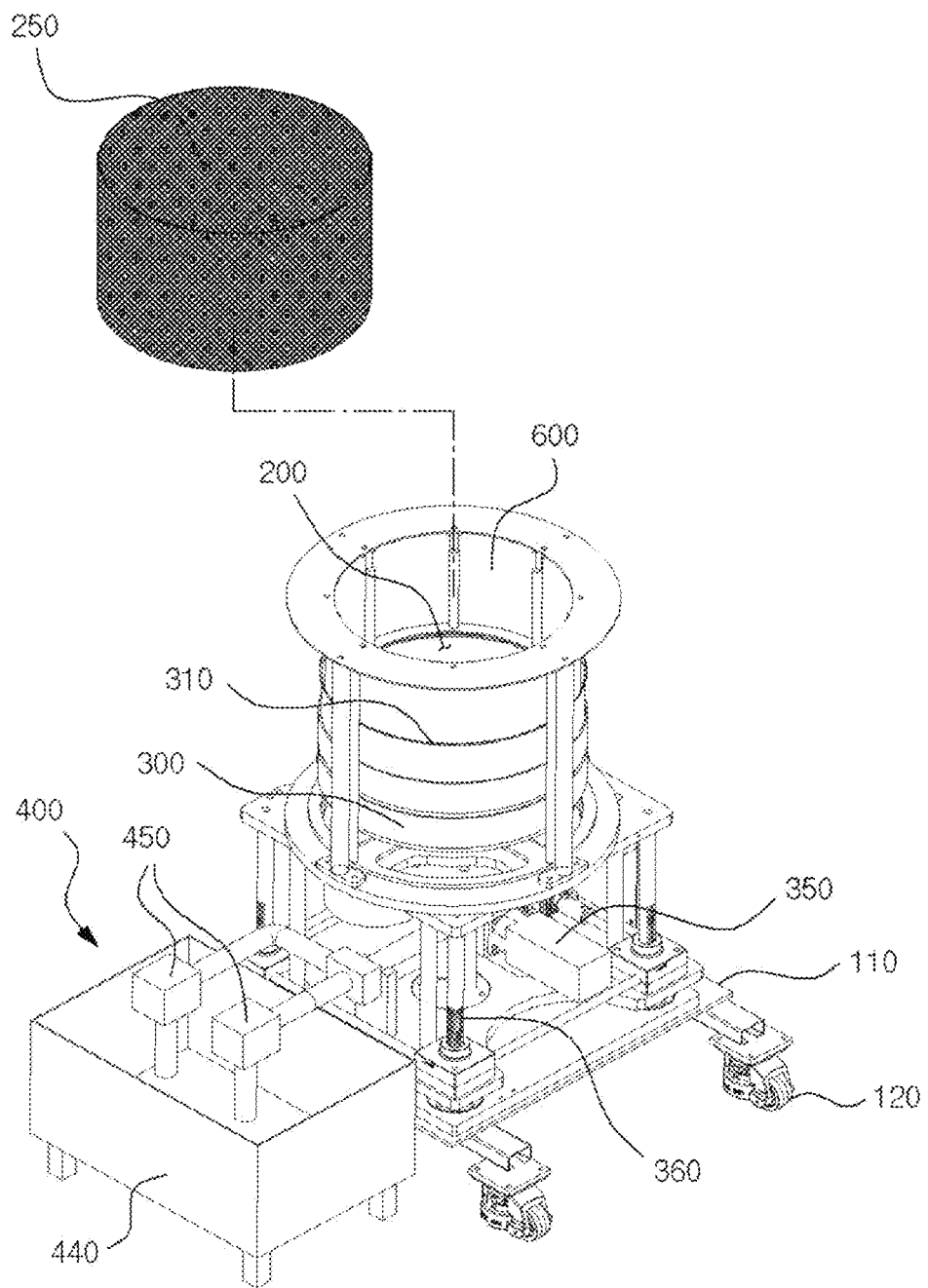
FIG. 2 is a perspective view showing the internal configuration of a frying apparatus having an oil recycling and purifying function and a frying oil separating function according to the present invention.

FIG. 1 is a perspective view showing the exterior of a frying apparatus having an oil recycling and purifying function and a frying oil separating function according to the present invention. FIG. 2 is a perspective view showing the internal configuration of a frying apparatus having an oil recycling and purifying function and a frying oil separating function according to the present invention.

As shown in FIGS. 1 and 2, the frying apparatus having an oil recycling and purifying function and a frying oil separating function according to the present invention preferably includes: a main body casing 100 that forms the exterior, a basket 250 which is provided at the outside of the main body casing 100, puts a cooking material therein, and formed of a mesh body, at least one oil tank 300 that is configured to accommodate the basket at the inside of the main body casing 100 and stores a cooking oil therein, a cooking heater 310 that is provided on the outer peripheral surface of the oil tank 300, and boils the cooking oil stored inside the oil tank 300 to perform a fry cooking, and an oil purifying and circulating unit 400 that is provided in communication with the lower part of the oil tank 300, and is configured to circulate the process in which the cooking oil used for fry cooking is collected and purified at the oil tank, and then supplied to the oil tank again.

The body casing is provided to form the exterior of a roughly rectangular parallelepiped, as illustrated. Further, an oil purifying and circulating unit is provided at the upper part of the main body casing, and is provided with a mounting base 110 for supporting them. A moving wheel 120 is provided at the lower part of the mounting base to facilitate movement and installation.

According to the structure described above, unlike the conventional case, the heater for heating the frying oil is not provided in the inside of the oil tank, but a cooking heater is provided on the outer peripheral surface of the oil tank, so that it is possible to prevent the heater from being easily burned or generating foreign substances inside the oil tank in the conventional one, and cleaning can be more easily performed.

Further, the first embodiment of the present invention further includes a basket holder 200 provided to expose an opening to the upper part of the main body casing. The basket 250 is provided to be hung and accommodated in the inside of the basket holder 200. At this time, an opening though which the basket holder is exposed is formed in the upper part of the main body casing.

The basket holder is preferably provided in a cylindrical shape like a pot with an open upper part. Further, the basket is provided in a cylindrical shape having an opened upper part to correspond to the shape and size of the basket hanging so as to fit into the inside of the basket holder.

Further, the present invention further includes an oil-outflow preventive cover 600 fixedly installed between the oil tank 300 and the basket holder 200.

Figure 3:
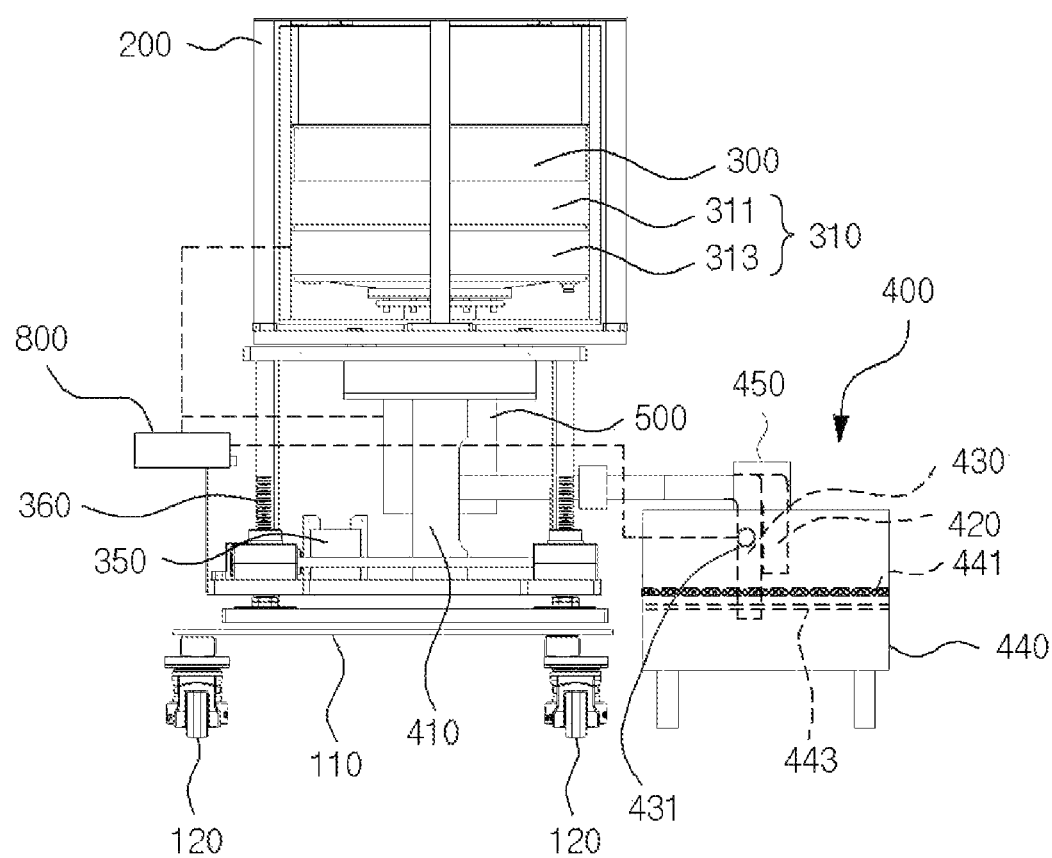
FIG. 3 is a front view showing the internal configuration of a frying apparatus having an oil recycling and purifying function and a frying oil separating function according to the present invention.
Figure 4:
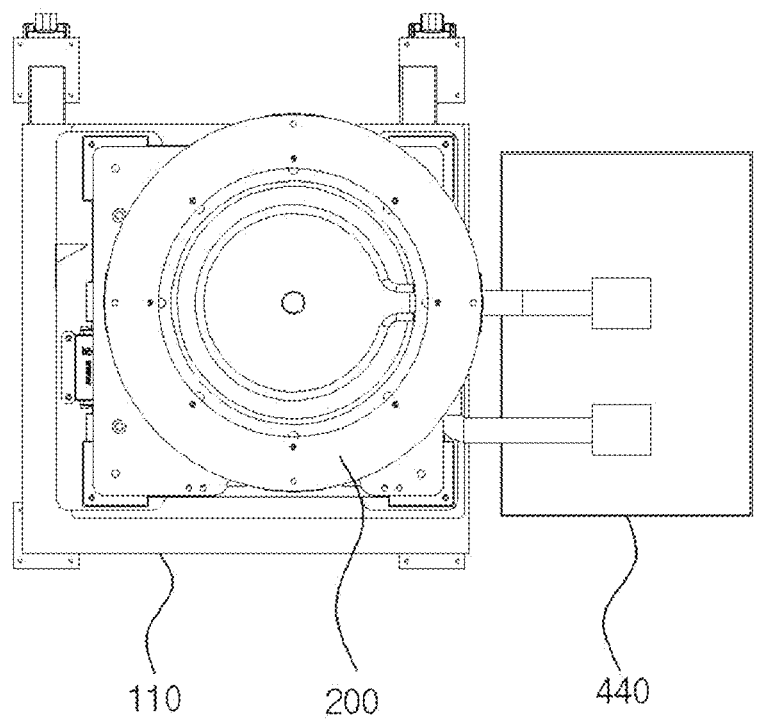
FIG. 4 is a side view showing the internal configuration of a frying apparatus having an oil recycling and purifying function and a frying oil separating function according to the present invention.

FIG. 3 is a front view showing the internal configuration of a frying apparatus having an oil recycling and purifying function and a frying oil separating function according to the present invention. FIG. 4 is a side view showing the internal configuration of a frying apparatus having an oil recycling and purifying function and a frying oil separating function according to the present invention.

Referring to FIGS. 3 and 4, the present invention includes a rotary drive unit 500 that allows the basket 250 shown in FIG. 2 to rotate so that oil is separated from the fried food contained inside the basket by rotational centrifugal force. According to the structure described above, when the basket 250 is rotated by the rotary drive unit 500, the oil-outflow preventive cover 600 prevents the oil separated from the fried food contained in the basket 250 from splashing to other places. Further, as shown in FIG. 3, the cooking heater 310 preferably includes a first heater 311 provided at the upper part and including a heating wire for maintaining an instantaneous temperature when the fried food material is charged, and a second heater 313, which is provided at the lower part of the first heater 311 and including a heating wire for heating the frying oil inside the oil tank to about 150° C. to 170° C.

Thereby, when the oil tank rises to wrap the basket containing the fried food material therein, the fried food material is instantaneously heated by the first heater 311 and the second heater 313, and the frying oil can be effectively double-heated to a sufficient temperature at which the fry cooking is performed.

More specifically, as shown in FIG. 3, the lower part of the oil tank 300 is provided with an elevating unit 360 including a power base so as to elevate the oil tank up and down, and the elevating unit 360 is provided so that the elevating operation is performed by the elevating drive unit 350 including an actuator such as a motor.

In one embodiment of the present invention, it is preferable that the elevating unit 360 includes screw bars provided at four corners at the bottom of a square plate supporting the oil tank 300, so that the oil tank is supported by driving the elevating drive unit 350 and is provided so as to elevate up and down.

Referring to FIGS. 2 to 4, in a first embodiment of the present invention, the oil tank 300 is provided so as to be able to elevate up and down to accommodate the basket 250 when ascending from the lower part of the basket hanging 200, so that a frying oil such as cooking oil is stored therein. Further, the elevating drive unit 350 which is connected to the oil tank 300 and provides a driving force so that the oil tank 300 can elevate up and down is further included. The elevating drive unit 350 is provided adjacent to the lower part of the oil tank 300. The rotary drive unit 500 of FIG. 3 allows the basket 250 of FIG. 2 to rotate when the oil tank 300 descends, and is provided adjacent to the lower central part of the basket rack 200 to be connected to the basket holder 200. According to the first embodiment of the present invention described above, as the ascending and descending motion of the oil tank 300 is possible, the fry cooking is completed, and then the fried food does not need to manually take out one by one by a cooking person, but the oil separation work can be performed automatically on the spot immediately, thereby preventing the formation of an oxide film of oil, separating a frying oil smoothly and efficiently, making the texture of the fried food crispy and better, and at the same time, preventing excessive intake of fried oil.

On the other hand, as shown in FIG. 3, the frying apparatus having an oil recycling and purifying function according to the present invention preferably includes a control unit 800 that controls based on the result of sensing each actuator including a cooking heater, a suction pump, a purifying circulation valve, an elevating drive unit and a rotation drive unit, etc. by the user's input signal and detection sensor.

Thereby, the control unit 800 easily controls the oil purifying and circulating unit so that the cooking oil used for fry cooking always maintains a constant purity, thereby automatically performing the process of purifying and recirculating the frying oil periodically and continuously.

Figure 5:
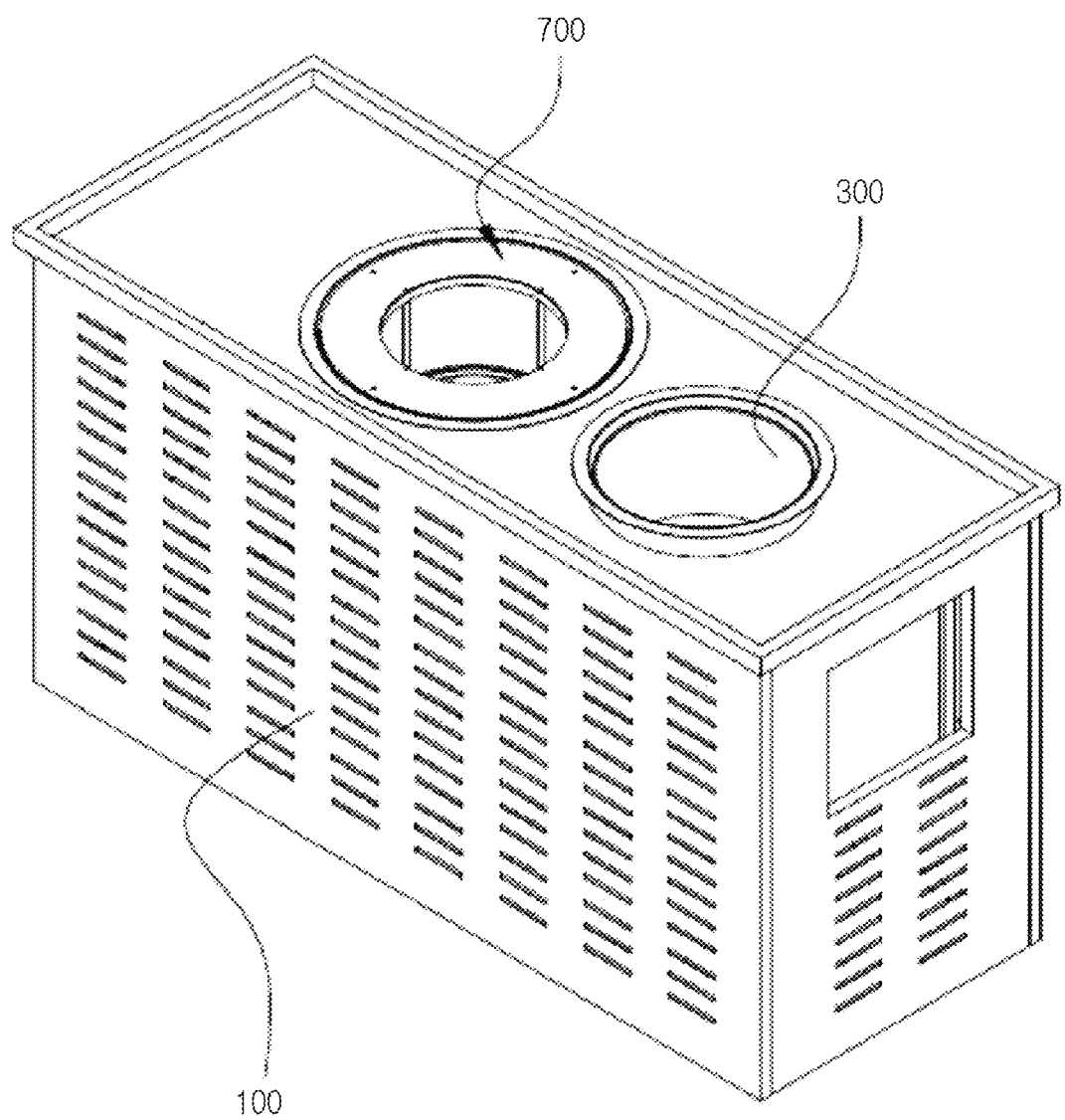
FIG. 5 is a perspective view showing the exterior of a frying apparatus having an oil recycling and purifying function and a frying oil separating function a second embodiment of the present invention.
Figure 6:
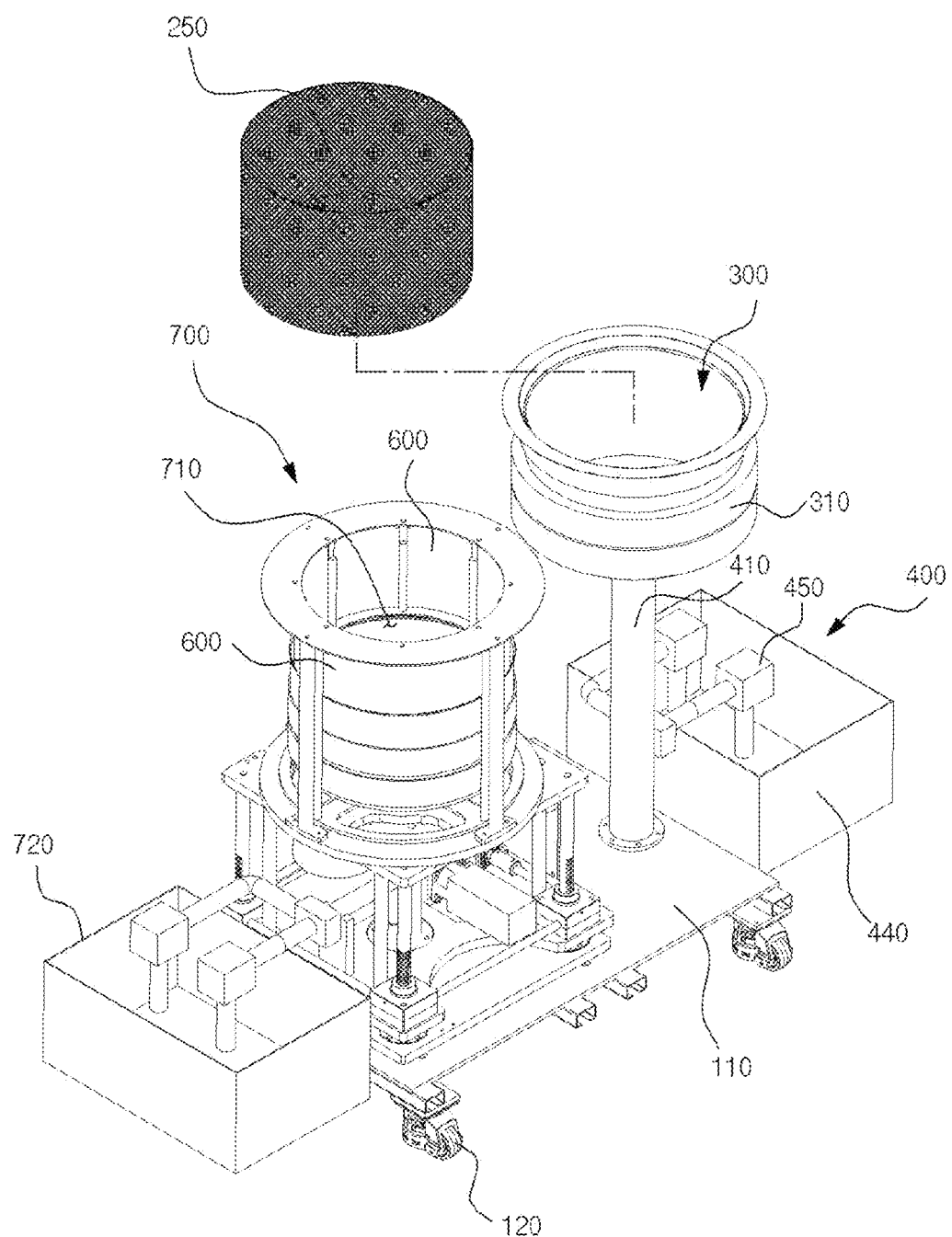
FIG. 6 is a perspective view showing the internal configuration of a frying apparatus having an oil circulation refining function and a frying oil separation function according to a second embodiment of the present invention.

FIG. 5 is a perspective view showing the exterior of a frying apparatus having an oil recycling and purifying function and a frying oil separating function a second embodiment of the present invention. FIG. 6 is a perspective view showing the internal configuration of a frying apparatus having an oil circulation refining function and a frying oil separation function according to a second embodiment of the present invention.

Referring to FIG. 5, according to a second embodiment of the present invention, an oil tank 300 is provided on one side of the upper part of the main body casing 100 so that an opening is exposed at the inside of the main body casing 100. An oil separating unit 700 provided so as to expose an opening at the inside of the main body casing 100 is further provided on the other side of the upper part of the main body casing 100.

Referring to FIG. 6, the basket 250 is provided to be hung and accommodated in the inside of the oil tank 300. Further, in the oil separating unit 700, the basket 250 containing the fried food for which the fried food has been fried is transferred and hung inside to accommodate the fried food. The oil separating unit 700 has an opening that is exposed through the other side of the upper part of the main body casing.

Figure 7:
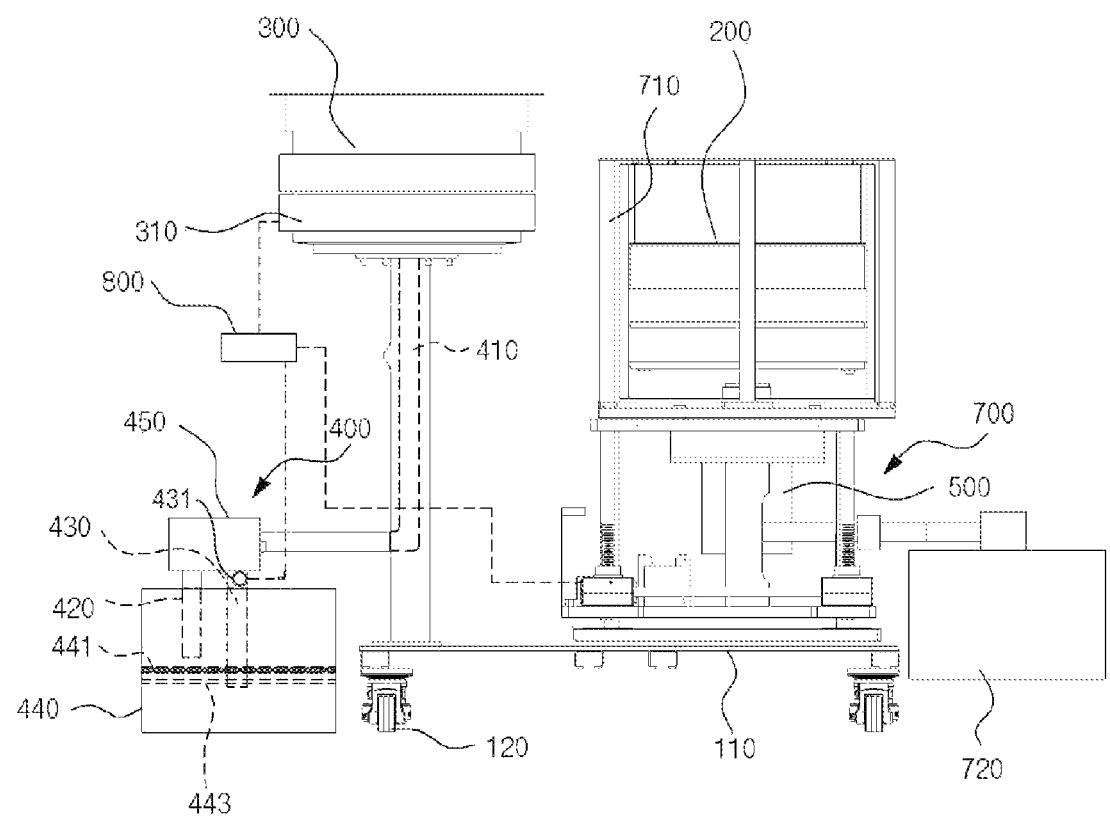
FIG. 7 is a front view showing an internal configuration of a frying apparatus having an oil circulation refining function and a frying oil separation function according to a second embodiment of the present invention.
Figure 8:
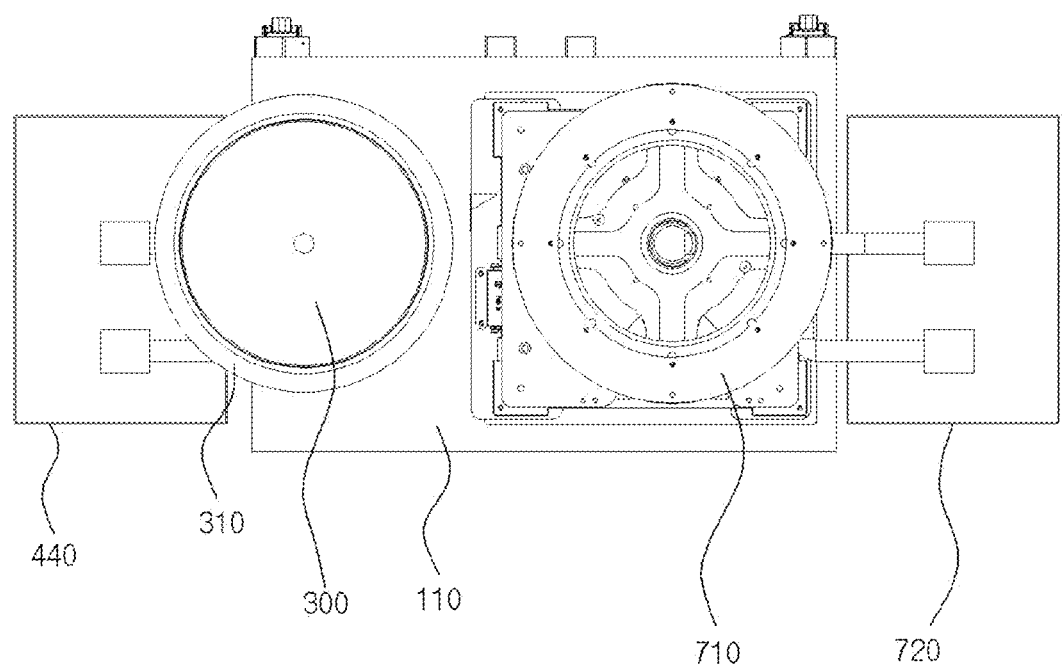
FIG. 8 is a side view showing an internal configuration of a frying apparatus having an oil circulation refining function and a frying oil separation function according to a second embodiment of the present invention.

FIG. 7 is a front view showing an internal configuration of a frying apparatus having an oil circulation refining function and a frying oil separation function according to a second embodiment of the present invention. FIG. 8 is a side view showing an internal configuration of a frying apparatus having an oil circulation refining function and a frying oil separation function according to a second embodiment of the present invention.

Referring to FIGS. 7 and 8, the oil separating unit 700 includes a rotating body 710 that is provided so as to accommodate the basket 250 therein, and an oil recovery tank 720 that is provided in communication with the rotating body 710 and the oil-outflow preventive cover 600 and allows the oil separated from the fried food contained inside the basket 250 to be separately collected and stored when the rotating body 710 rotates, wherein a basket hook 200 is provided in the inside of the rotating body 710, so that a basket containing fried foods that have been cooked can be hung on the upper part, and the rotating body 710 is connected to the rotating drive unit 500, moved to the inside of the rotating body 710 by the rotation driving unit, and the basket 250 accommodated in the rotating body 710 is also rotated to perform oil separation work of the fried food.

According to the third embodiment of the present invention, it has the same configuration as the first embodiment of the present invention described above. The basket 250 is provided to be hung and accommodated in the inside of a further second oil tank 300a, and one side of the upper part of the main body casing 100 is provide with another oil tank 300 so that an opening is exposed at the inside of the main body casing 100, and the other side of the upper part of the main body casing 100 is provided so as to expose an opening the inside of the main body casing 100. The basket 250 containing the fried food that has been fried and cooked is moved from the oil tank 300, and an oil separation unit 700 that is hung and accommodated inside is further provided. The oil separation unit 700 includes a rotating body having an opening exposed through the other upper side of the main body casing 100 and having a basket 250 accommodated therein, and an oil recovery tank 720 that is provided in communication between the rotating body and the oil-outflow preventive cover 600 so that the oil separated from the frying inside the basket 250 is separately collected and stored during rotation of the rotating body, wherein the rotating body is connected to the rotation drive unit 500, and rotates together with the basket 250 by the rotation drive unit 500.

As shown in FIGS. 2 to 3 and FIGS. 6 to 7, the oil purifying and circulating unit 400 of the present invention includes: a purifying and circulating pipe 410 that is provided in communication with the lower central part of the oil tank 300, and is provided in a double pipe structure so that the used cooking oil is discharged from the inside, while the purified cooking oil is supplied to the oil tank 300 again, an oil discharge pipe 420 provided on one side of the end of the purifying and circulating pipe 410 to discharge the used cooking oil, a purified oil suction pipe 430 that is provided on the other side of the end part of the purifying and circulating pipe 410 to provide a path through the purified cooking oil is sucked again through the purifying and circulating pipe 410, an oil purifying and circulating tank 440 in which the oil discharge pipe 420 and the refined oil suction pipe 430 are connected and provided so that the cooking oil flowing in through the oil discharge pipe 420 is purified and only the purified cooking oil is suctioned through the purified oil suction pipe 430, and a suction pump 431 that is provided in a purified oil suction pipe 430 to provide an intake input for sucking the purified cooking oil from a purified circulation tank 440 of oil.

Further, the oil purifying and circulating tank 440 is provided in the form of a box having an opened upper part, a filter mesh 441 is provided above the middle part, and a purifying filter 443 is provided below the height of the middle part, and the oil discharge pipe 420 extends only from the inside of the oil purifying and circulating tank to the upper part of the filter mesh 441. The purified oil suction pipe 430 is provided so as to extend from the inside of the purified oil purifying and circulating tank to the lower part of the purifying filter. The purifying and circulating pipe 410 is provided so that an inner pipe of the central part communicates with the oil discharge pipe 420 and an exterior communicates with the purified oil suction pipe 430.

In any of the first to third embodiments of the present invention described above, as shown in FIG. 6, the oil-outflow preventive cover is provided to be spaced apart from the basket 250 accommodated in at least one of the rotating body 710 and the basket holder 200 in the body casing 100.

Accordingly, a frying apparatus having an oil recycling and purifying function and a frying oil (fat) separating function can be provided in which fry cooking, circulating purification of cooking oil, and separation and removal of the frying oil are all performed integrally at one place, so that with a compact configuration and a simple configuration that is not complicated, it is possible to avoid being restricted by the installation space and to reduce overall costs, the fried food can always be cooked hygienically with cleanly purified cooking oil, and the taste of the fried food can also be improved, the consumption of the cooking oil can also be minimized to reduce cost, and the process of separating the frying oil from the frying food is extremely convenient and safe by allowing the oil to be conveniently separated and removed from an immediate next frying in an automatic manner at the position where the frying cooking is performed.

Although the present invention has been described in detail with reference to specific examples, this is intended to specifically explain the present invention, and the present invention is not limited thereto. It will be apparent that modifications and improvements can be made by those of ordinary skill in the art within the technical idea of the present invention.

All simple modifications or modifications of the present invention fall within the scope of the present invention, and the specific scope of protection of the present invention will be clarified by the appended claims.

EXPLANATION OF SYMBOLS

100: main body casing
200: basket holder
250: basket
300: oil tank
310: cooking heater
350: elevating drive unit
360: elevating unit
400: oil purifying and circulating unit
410: purifying and circulating pipe
420: oil discharge pipe
430: purified oil suction pipe
431: suction pump
440: oil purifying and circulating tank
450: purified oil circulation valve
500: rotary drive unit
600: oil-outflow preventive cover
700: oil separation unit
710: rotating body
720: oil recovery tank

What is claimed is:

1. A frying apparatus having an oil recycling and purifying function and a frying oil separating function comprising:
   a main body casing that forms an exterior,
   a basket which is configured to put a cooking material therein, and formed of a mesh body,
   at least one oil tank that is configured to accommodate the basket at an inside of the main body casing and store a cooking oil therein,
   a cooking heater that is provided on an outer peripheral surface of the oil tank and configured to boil the cooking oil stored inside the oil tank to perform a fry cooking,
   an oil purifying and circulating unit that is provided in communication with a lower part of the oil tank, and is configured to circulate a process in which the cooking oil used for fry cooking at the oil tank is collected and purified, and then supplied to the oil tank again,
   a rotary drive unit that allows the basket to rotate so that oil is separated from fried foods contained inside the basket by rotational centrifugal force,
   a basket holder provided so as to expose an opening to an upper part of the main body casing, with the basket being provided so as to be hung and accommodated inside the basket holder, and
   an oil-outflow preventive cover that is fixedly installed between the oil tank and the basket holder to prevent the oil separated from the fried foods contained in the basket from splashing to other places during rotation of the basket,
   wherein the oil-outflow preventive cover is provided to be radially spaced from the basket accommodated in the basket holder in the main body casing,
   wherein the oil tank further includes an elevating drive unit that is provided so that it can be elevated and descended to accommodate the basket when ascending from a lower part of the basket holder, and is connected to the oil tank and provides a driving force that allows the oil tank to elevate,
   the elevating drive unit is provided adjacent to the lower part of the oil tank, and the rotary drive unit allows the basket to rotate when the oil tank descends, and is provided adjacent to a lower center of the basket holder to be connected with the basket holder, wherein the oil purifying and circulating unit includes:

a purifying and circulating pipe that is provided in communication with a lower central part of the oil tank, and is provided in a double pipe structure so that the used cooking oil is discharged from the inside of the oil tank, while the purified cooking oil is supplied to the oil tank again, an oil discharge pipe provided on one side of an end part of the purifying and circulating pipe to discharge the used cooking oil, a purified oil suction pipe that is provided on opposite side of the end part of the purifying and circulating pipe to provide a path through the purified cooking oil is sucked again through the purifying and circulating pipe, an oil purifying and circulating tank in which the oil discharge pipe and the purified oil suction pipe are connected and provided so that the cooking oil flowing in through the oil discharge pipe is purified and only the purified cooking oil is suctioned through the purified oil suction pipe, and a suction pump that is provided in the purified oil suction pipe to provide an intake input for sucking the purified cooking oil from the oil purifying and circulating tank, wherein the oil purifying and circulating tank is provided in a form of a box having an opened upper part, a filter mesh is provided above a middle part of the oil purifying and circulating tank, and a purifying filter is provided below a height of the middle part, the oil discharge pipe extends only from the inside of the oil purifying and circulating tank to an upper part of the filter mesh, the purified oil suction pipe is provided so as to extend from the inside of the oil purifying and circulating tank to a lower part of the purifying filter, and the purifying and circulating pipe is provided so that an inner pipe of a central part communicates with the oil discharge pipe and an exterior pipe communicates with the purified oil suction pipe.

\* \* \* \* \*